United States Patent
Gupta et al.

(10) Patent No.: US 11,194,730 B2
(45) Date of Patent: Dec. 7, 2021

(54) APPLICATION INTERFACE TO DEPOPULATE DATA FROM CACHE

(71) Applicant: International Business Machines Corporation, Armonk, NY (US)

(72) Inventors: Lokesh M. Gupta, Tucson, AZ (US); Matthew G. Borlick, Tucson, AZ (US); Kyler A. Anderson, Sahuarita, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 16/785,638

(22) Filed: Feb. 9, 2020

(65) Prior Publication Data

US 2021/0248080 A1 Aug. 12, 2021

(51) Int. Cl.
*G06F 12/0811* (2016.01)
*G06F 12/0871* (2016.01)
*G06F 12/0891* (2016.01)
*G06F 9/50* (2006.01)

(52) U.S. Cl.
CPC ........ *G06F 12/0891* (2013.01); *G06F 9/5016* (2013.01); *G06F 9/5022* (2013.01); *G06F 12/0811* (2013.01); *G06F 12/0871* (2013.01)

(58) Field of Classification Search
None
See application file for complete search history.

(56) References Cited

U.S. PATENT DOCUMENTS

| | | | | |
|---|---|---|---|---|
| 5,675,763 A | * | 10/1997 | Mogul | G06F 12/0897 711/135 |
| 7,539,819 B1 | * | 5/2009 | Moll | G06F 12/084 711/122 |
| 10,235,054 B1 | | 3/2019 | Clark et al. | |
| 2002/0073282 A1 | * | 6/2002 | Chauvel | G06F 12/0292 711/122 |
| 2007/0005906 A1 | * | 1/2007 | Miyamoto | G06F 12/0804 711/143 |
| 2012/0246408 A1 | * | 9/2012 | Yamamura | G06F 12/128 711/125 |
| 2015/0039837 A1 | | 2/2015 | Quan et al. | |

(Continued)

*Primary Examiner* — Kaushikkumar M Patel
(74) *Attorney, Agent, or Firm* — Nelson IP; Daniel P. Nelson

(57) ABSTRACT

A method for depopulating data from cache includes receiving a command to depopulate the cache of selected data. The command has an application identifier as a parameter. The application identifier is associated with an application that previously accessed the data. The method searches the cache for data elements that are marked with the application identifier and removes the data elements from the cache. In certain embodiments, the data elements are marked with a first application identifier associated with an application that staged the data elements into the cache, and a second application identifier associated with an application that last accessed the data elements. In certain embodiments, removing the data elements from the cache comprises only removing the data elements from the cache if the application identifier matches one or more of the first application identifier and the second application identifier. A corresponding system and computer program product are also disclosed.

20 Claims, 16 Drawing Sheets

(56) References Cited

U.S. PATENT DOCUMENTS

2017/0091117 A1* 3/2017 Cain, III ............. G06F 12/0895
2018/0300257 A1 10/2018 Ash et al.
2019/0155750 A1 5/2019 Wang et al.

* cited by examiner

APPLICATION INTERFACE TO DEPOPULATE DATA FROM CACHE

BACKGROUND

Field of the Invention

This invention relates to systems and methods for implementing a cache made up of heterogeneous memory types.

Background of the Invention

In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

Caches are often provided as multi-level caches. For example, a caching system may include both a "primary" and "secondary" caches. When reading data, a computing system or device may first look for data in the primary cache and, if the data is absent, look for the data in the secondary cache. If the data is not in either cache, the computing system or device may retrieve the data from disk drives or other backend storage devices that reside behind the cache. When writing data, a computing system or device may write data to the primary cache. This data may eventually be destaged to the secondary cache or a storage device to make room in the primary cache.

Flash memory and other solid-state memory devices can potentially create caches with much larger storage capacities than those using more expensive memory such as dynamic random-access memory (DRAM) cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM uses flash memory to store data, SCM exhibits some of the same limitations and deficiencies as flash memory, such as write-cycle limits and issues with data fragmentation.

SUMMARY

The invention has been developed in response to the present state of the art and, in particular, in response to the problems and needs in the art that have not yet been fully solved by currently available systems and methods. Accordingly, systems and methods have been developed to depopulate data from cache. The features and advantages of the invention will become more fully apparent from the following description and appended claims, or may be learned by practice of the invention as set forth hereinafter.

Consistent with the foregoing, a method for depopulating data from cache is disclosed. The method receives a command to depopulate a cache of selected data. The command has an application identifier as a parameter. The application identifier may be associated with an application that previously accessed the data. The method searches the cache for data elements that are marked with the application identifier and removes the data elements from the cache. In certain embodiments, the data elements are marked with a first application identifier associated with an application that staged the data elements into the cache, and a second application identifier associated with an application that last accessed the data elements. In certain embodiments, removing the data elements from the cache comprises only removing the data elements from the cache if the application identifier matches one or more of the first application identifier and the second application identifier.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
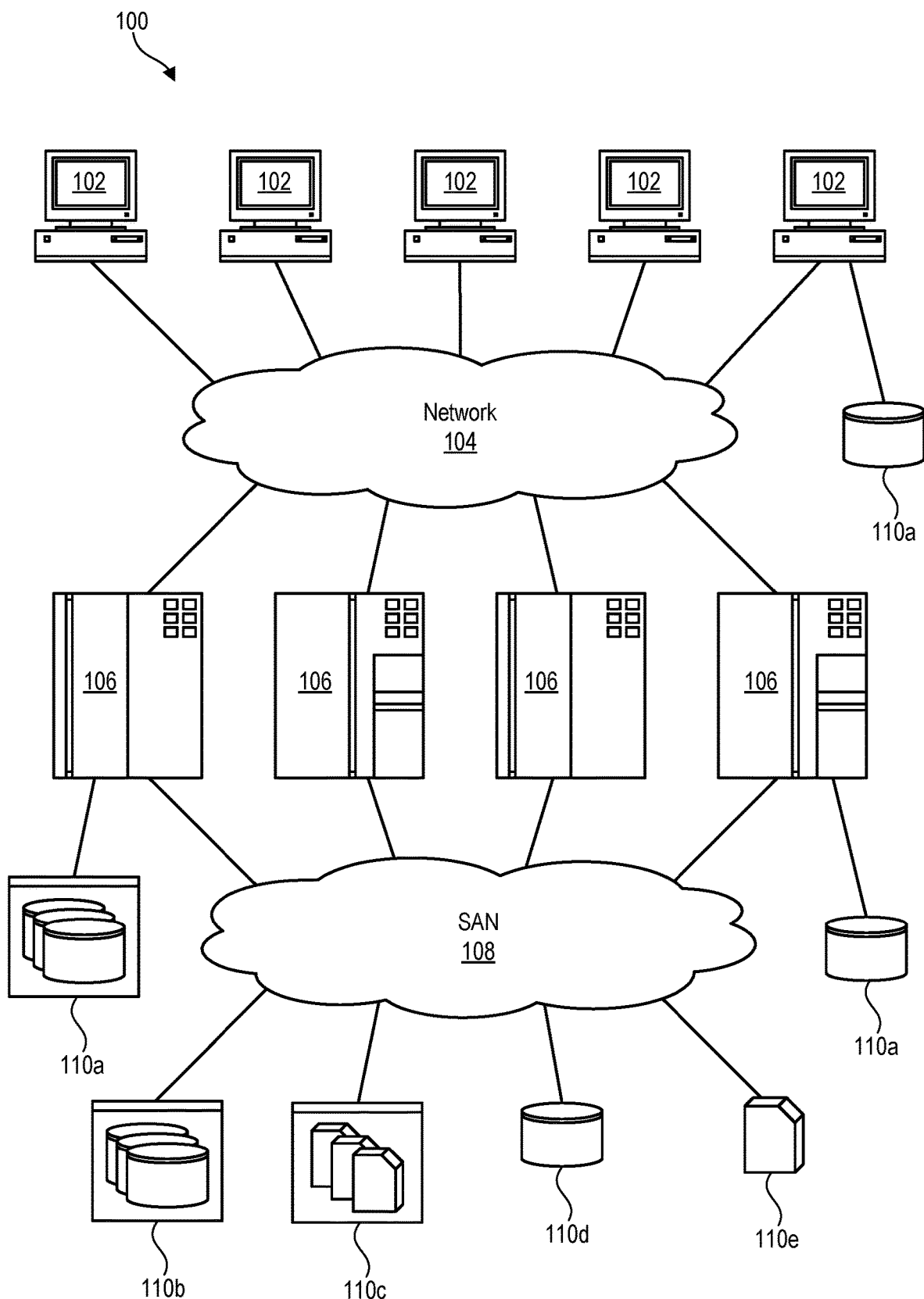
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
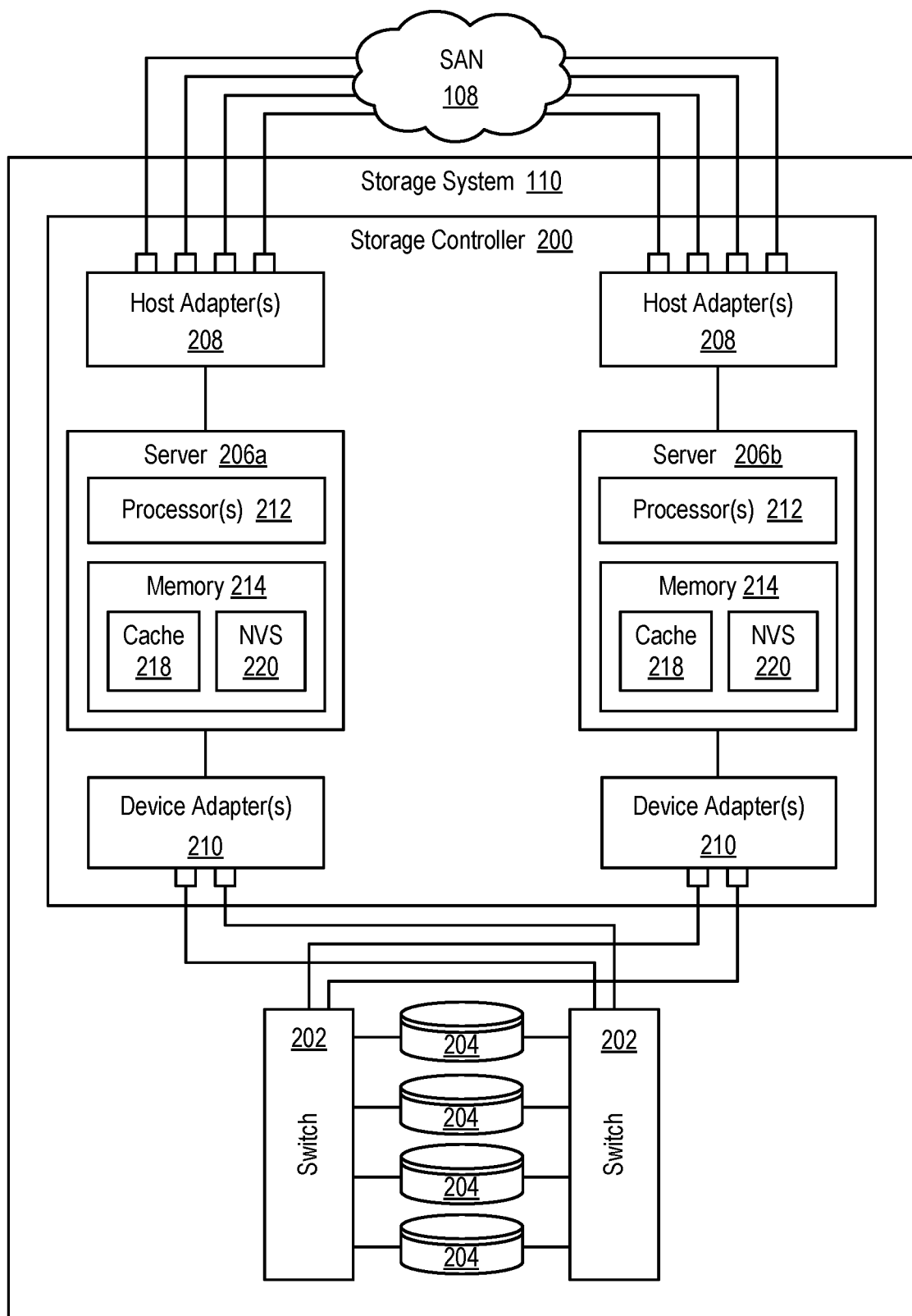
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it in its cache 218 in the event it is required again. If the data is requested again by a host system 106, the server 206 may fetch the data from the cache 218 instead of fetching it from the storage drives 204, saving both time and resources. Similarly, when a host system 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
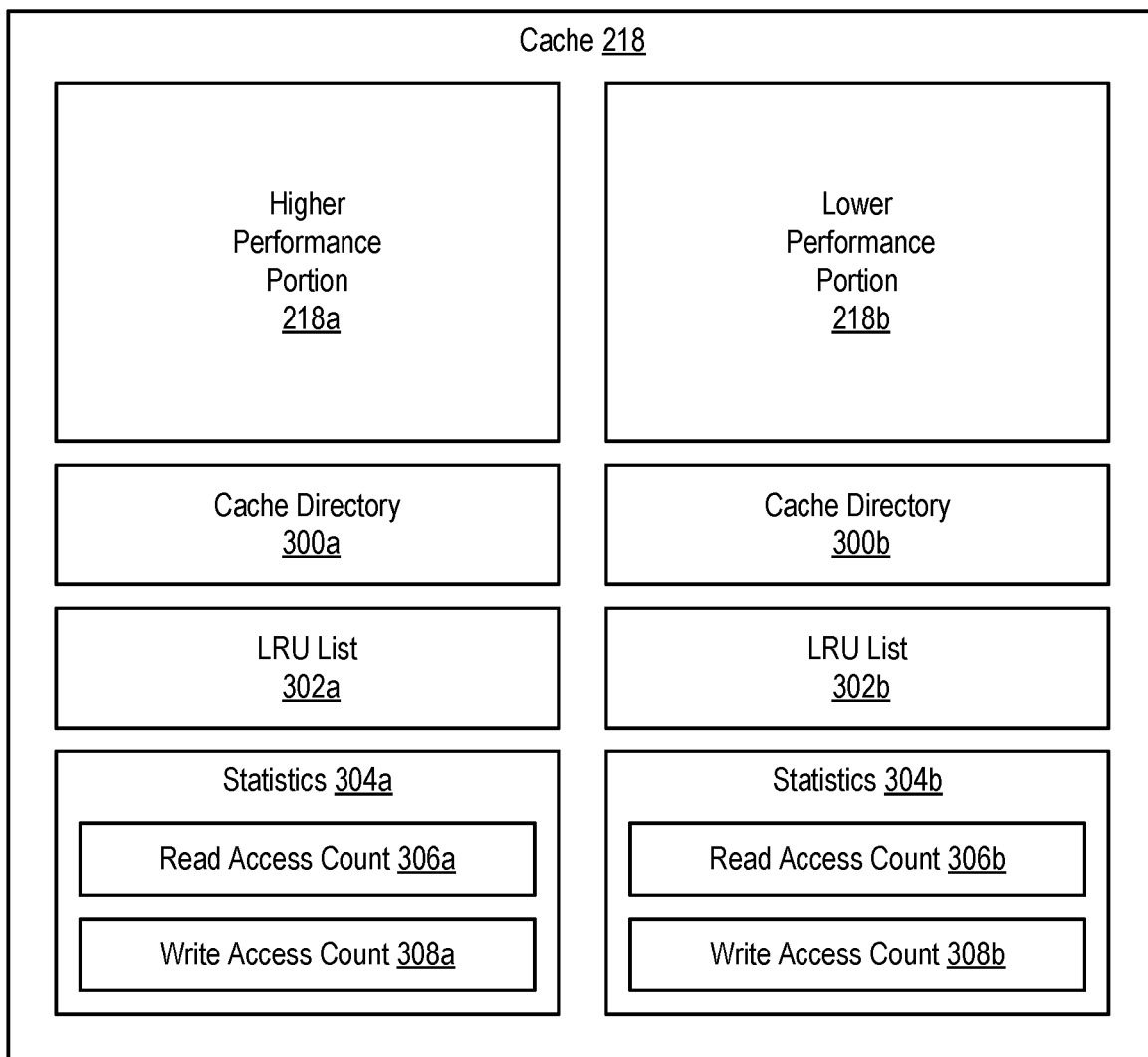
FIG. 3 is a high-level block diagram showing a cache comprising a higher performance portion (e.g., DRAM cache) and a lower performance portion (e.g., SCM cache)

Referring to FIG. 3, as previously mentioned, flash memory and other solid-state memory devices can potentially create caches with much larger storage capacities than those using more expensive memory such as DRAM cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM may use flash memory to store data, SCM may exhibit some of the same limitations and deficiencies as flash memory, such as write-cycle limits and issues with data fragmentation. Because of its potential to create caches with much larger storage capacities, systems and methods are needed to effectively incorporate flash memory, such as SCM, into cache. Ideally, such systems and method will take into account the limitations and deficiencies of flash memory, such as write-cycle limits and data fragmentation issues.

FIG. 3 is a high-level block diagram showing a heterogeneous cache 218 (i.e., a cache 218 made up of heterogeneous memory types) comprising a higher performance portion 218a and a lower performance portion 218b. In certain embodiments, the higher performance portion 218a is made up of DRAM memory and the lower performance portion 218b is made up of SCM memory, although neither are limited to these types of memory. The higher performance portion 218a and lower performance portion 218b may be used together to provide a cache 218 within a storage system 110 such as the IBM DS8000™ enterprise storage system. Because memory making up the lower performance portion 218b is likely cheaper than memory making up the higher performance portion 218a, the lower performance portion 218b may be larger, perhaps much larger, than the higher performance portion 218a.

As shown, the higher performance portion 218a may have associated therewith a cache directory 300a, an LRU (least recently used) list 302a, and statistics 304a. The cache directory 300a may record which data elements are stored in the higher performance portion 218a and where they are stored. The LRU list 302a may be used to determine which data element in the higher performance portion 218a is the least recently used. The statistics 304 may include a read access count 306a and a write access count 308a for each data element (e.g., track) that resides in the higher performance portion 218a. The read access count 306 may be incremented each time the data element is read in the higher performance portion 218a. The write access count 308 may be incremented each time the data element is modified in the higher performance portion 218a.

Similarly, the lower performance portion 218b may also include a cache directory 300b, LRU list 302b, and statistics 304b. The cache directory 300b may record which data elements are stored in the lower performance portion 218b and where they are stored. The LRU list 302b may be used to determine which data element is the least recently used in the lower performance portion 218b. The statistics 304b may include a read access count 306b and write access count 308b for each data element (e.g., track) in the lower performance portion 218b. The read access count 306b may be incremented each time the corresponding data element is read in the lower performance portion 218b. The write access count 308b may be incremented each time the corresponding data element is modified in the lower performance portion 218b.

Figure 4:
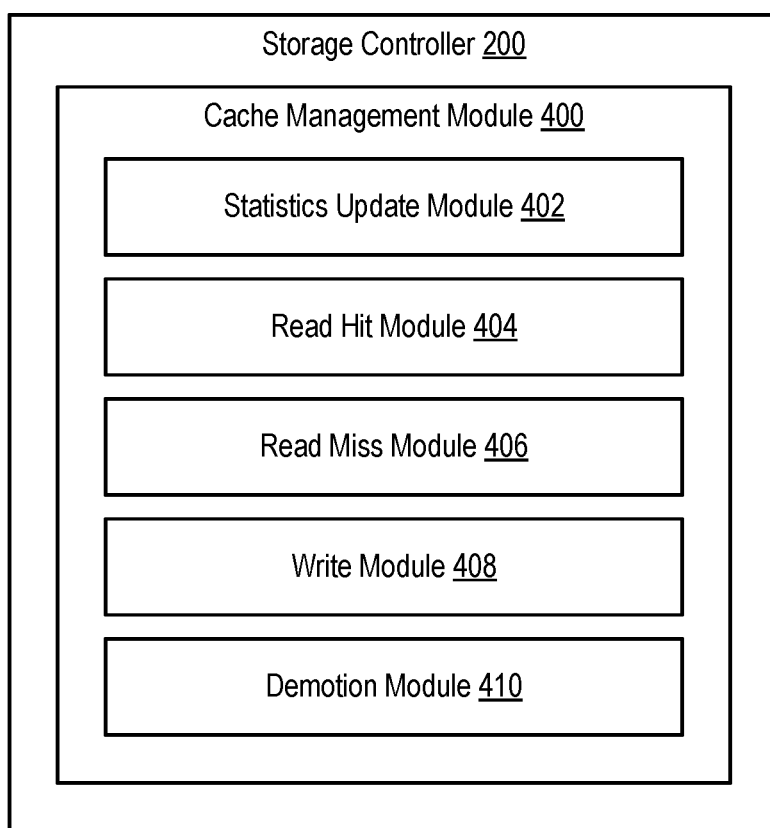
FIG. 4 is a high-level block diagram showing a cache management module in accordance with the invention.

Referring to FIG. 4, in certain embodiments, a cache management module 400 may be used to manage a heterogeneous cache 218 such as that illustrated in FIG. 3. Such a cache management module 400 may be hosted within the storage controller 200. The cache management module 400 may include various sub-modules to provide various features and functions. These modules may be implemented in hardware, software, firmware, or combinations thereof. The cache management module 400 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the cache management module 400 includes one or more of a statistics update module 402, read hit module 404, read miss module 406, write module 408, and demotion module 410. The statistics update module 402 maintains the statistics 304 associated with the heterogeneous cache 218. For example, each time a data element is read in the heterogeneous cache 218, the statistics update module 402 updates the associated read access count 306. Similarly, each time a data element is updated in the heterogeneous cache 218, the statistics update module 402 updates the associated write access count 308.

The read hit module 404 performs various actions when a read hit occurs in the heterogeneous cache 218. This may include either a read hit in the higher performance portion 218a or a read hit in the lower performance portion 218b. Several methods 500, 600, 700 that may be executed by the read hit module 404 will be discussed in association with FIGS. 5 through 7. By contrast, the read miss module 406 may perform various actions when a read miss occurs in the heterogeneous cache 218. One embodiment of a method 800 that may be executed by the read miss module 406 will be discussed in association with FIG. 8.

The write module 408 may perform various actions when data elements are updated in the heterogeneous cache 218. One embodiment of a method 900 that may be executed by the write module 408 will be discussed in association with FIG. 9. The demotion module 410, by contrast, may perform actions associated with demoting data elements from the heterogeneous cache 218 in order to clear storage space in the heterogeneous cache 218. Various methods 1000, 1100 that may be executed by the demotion module 410 will be discussed in association with FIGS. 10 and 11.

Figure 5:
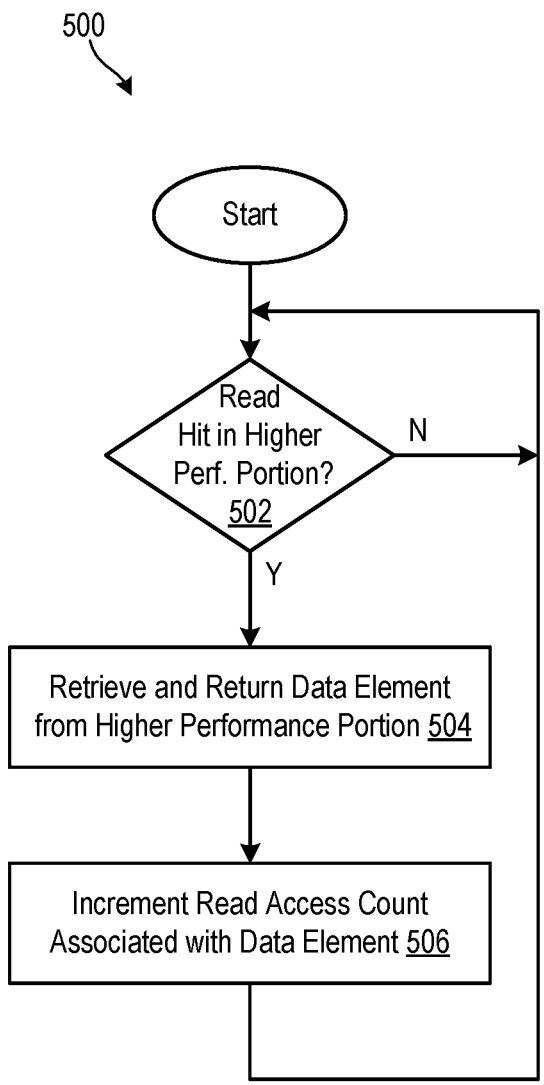
FIG. 5 is a flow diagram showing one embodiment of a method that may be executed in response to a read hit in the higher performance portion.

Referring to FIG. 5, one embodiment of a method 500 that may be executed in response to a read hit in the higher performance portion 218a of the heterogeneous cache 218 is illustrated. As shown, the method 500 determines 502 whether a read hit occurred in the higher performance portion 218a. That is, the method 500 determines 502 whether, in response to a read I/O request, a data element associated with the read I/O request was found in the higher performance portion 218a. If so, the method 500 retrieves 504 and returns 504 the data element from the higher performance portion 218a to an originator of the read request. The method 500 increments 506 the read access count 306a associated with the data element in response to the read hit.

Figure 6:
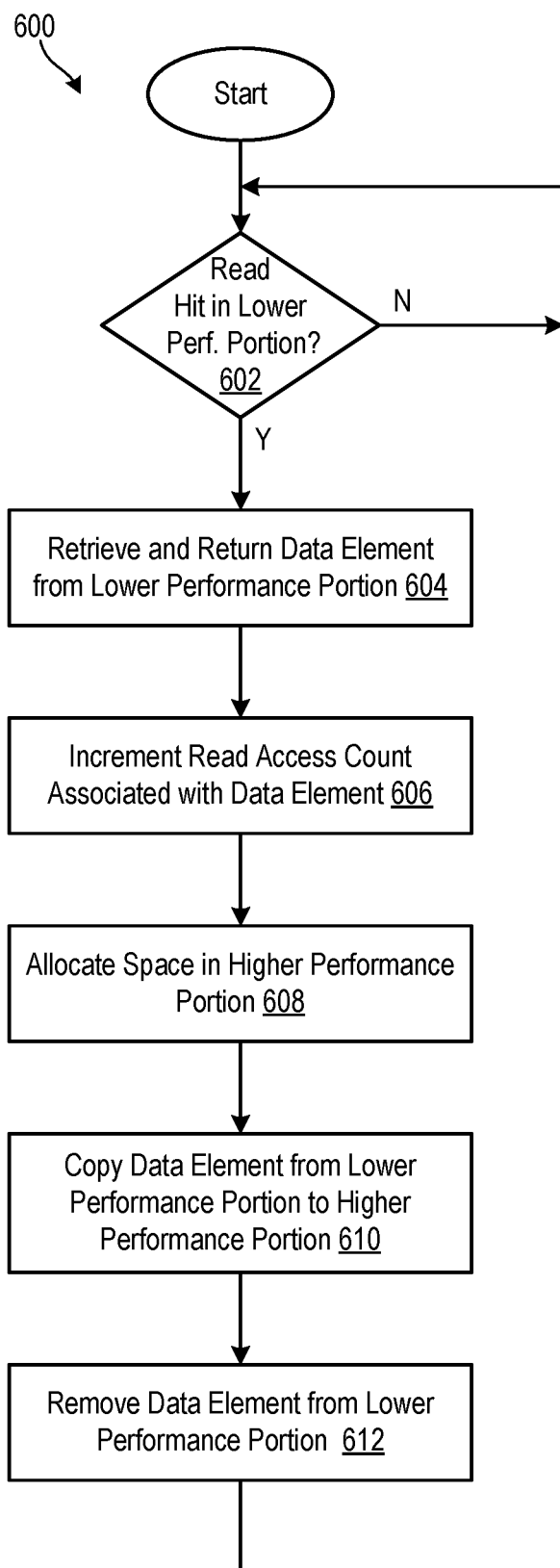
FIG. 6 is a flow diagram showing one embodiment of a method that may be executed in response to a read hit in the lower performance portion.

Referring to FIG. 6, one embodiment of a method 600 that may be executed in response to a read hit in the lower performance portion 218b is illustrated. As shown, the method 600 determines 602 whether a read hit occurred in the lower performance portion 218b of the heterogeneous cache 218. If so, the method 600 retrieves 604 and returns 604 a data element associated with the read request from the lower performance portion 218b to an originator of the read request. The method 600 then increments 606 the read access count 306b associated with the data element.

In response to the read hit, the method 600 also allocates 608 space in the higher performance portion 218a that is sufficient to accommodate the data element. In certain embodiments, this may include clearing space in the higher performance portion 218a by demoting a least recently used data element from the higher performance portion 218a. The method 600 then copies 610 the data element associated with the read request from the lower performance portion 218b to the higher performance portion 218a. The data element may then be removed 612 from the lower performance portion 218b. This may leave a single copy of the data element in the higher performance portion 218a.

Figure 7:
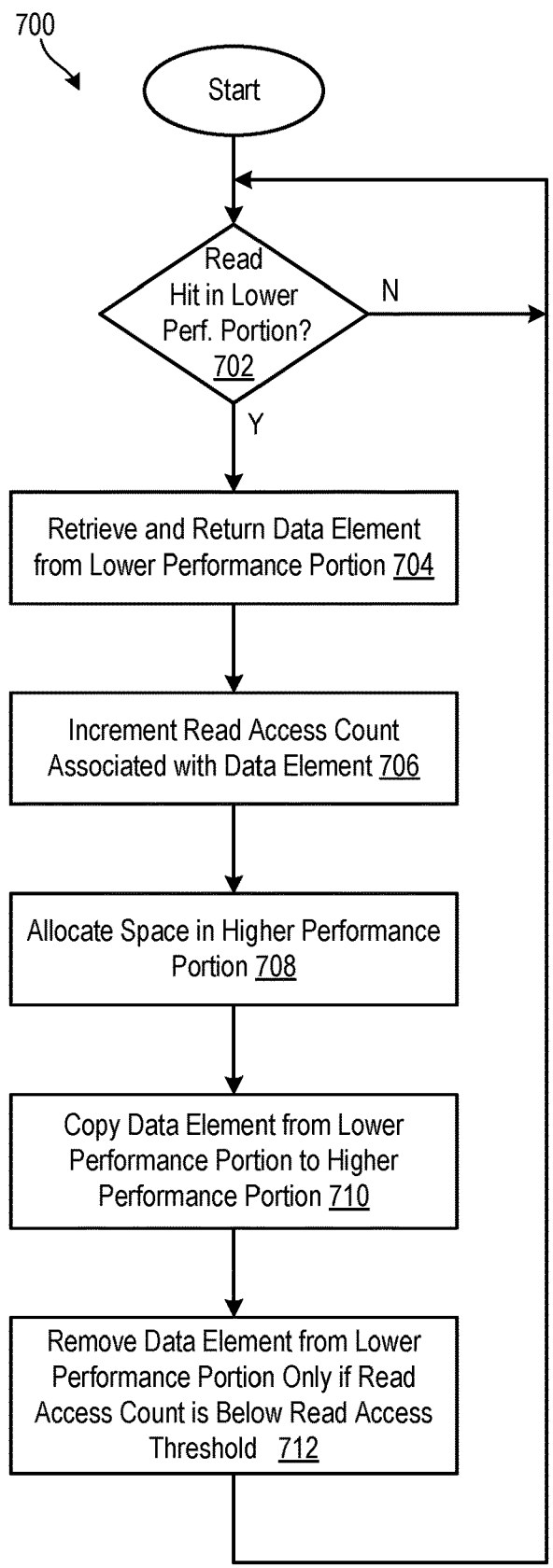
FIG. 7 is a flow diagram showing an alternative embodiment of a method that may be executed in response to a read hit in the lower performance portion.

Referring to FIG. 7, an alternative embodiment of a method 700 that may be executed in response to a read hit in the lower performance portion 218b is illustrated. This method 700 may be executed in place of the method 600 of FIG. 6. Each of the steps 702, 704, 706, 708, 710, are similar or identical to those disclosed in FIG. 6 except for the final step 712. In step 712, the alternative method 700 removes 712 the data element from the lower performance portion 218b only if the read access count 306b associated with the data element is below a selected threshold. This step 712 preserves a second copy of the data element in the lower performance portion 218b if the data element is read frequently. In the event the data element is demoted from the higher performance portion 218a at a future point in time, a copy of the data element will still reside in the lower performance portion 218b. This eliminates or reduces the need to copy the data element from the higher performance portion 218a to the lower performance portion 218b when the data element is demoted, which reduces processor utilization.

Figure 8:
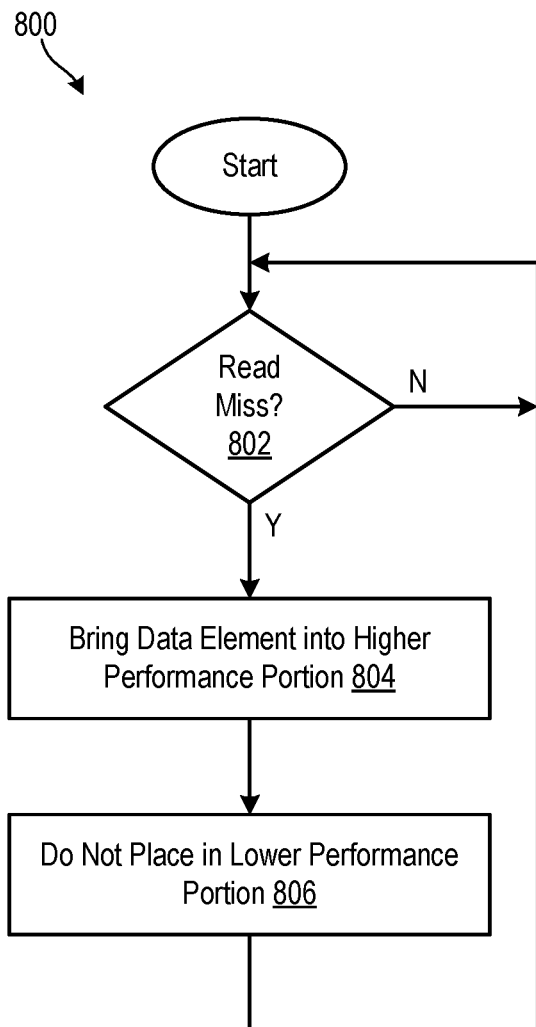
FIG. 8 is a flow diagram showing one embodiment of a method that may be executed in response to a read miss.

Referring to FIG. 8, one embodiment of a method 800 that may be executed in response to a read miss is illustrated. A read miss may occur when a requested data element cannot be found in either the higher performance portion 218a or the lower performance portion 218b of the heterogeneous cache 218. As shown, if a read miss occurs at step 802, the method 800 brings 804 the data element into the higher performance portion 218 of the heterogeneous cache 218 from backend storage drives 204. The method 800 does not place 806 the data element in the lower performance portion 218b at this time.

Figure 9:
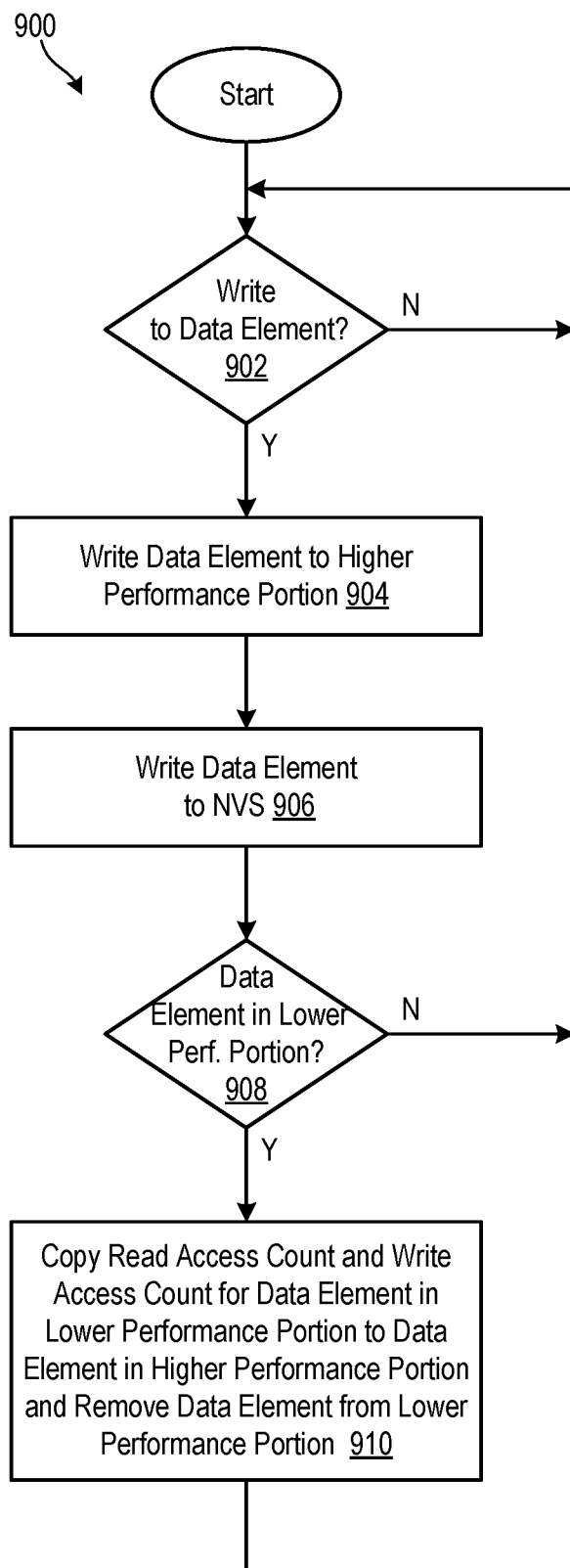
FIG. 9 is a flow diagram showing one embodiment of a method that may be executed in response to a write.

Referring to FIG. 9, one embodiment of a method 900 that may be executed in response to updating a data element in the heterogeneous cache 218 is illustrated. As shown, the method 900 determines 902 whether a write to a data element is requested. If so, the method 900 writes 904 the data element to the higher performance portion 218a of the heterogeneous cache 218. The method 900 also writes 906 the data element to the NVS 220 for purposes of redundancy as was previously described.

At this point, the method 900 determines 908 whether the data element (or a previous version thereof) is contained in the lower performance portion 218b. If the data element is stored in the lower performance portion 218b, the method 900 copies 910 statistics 304b (i.e., the read access count 306b and write access count 308b) associated with the data element from the lower performance portion 218b to the higher performance portion 218a. The method 900 then removes 910 the data element from the lower performance portion 218b.

Figure 10:
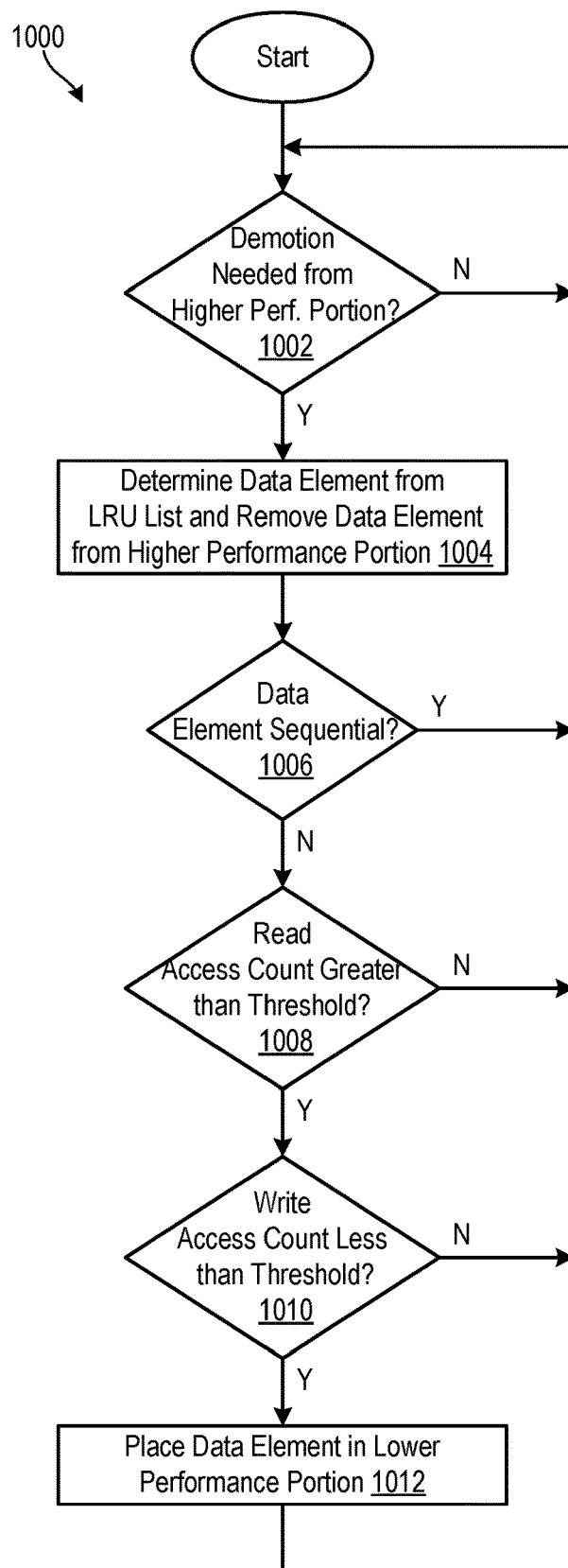
FIG. 10 is a flow diagram showing one embodiment of a method that may be executed when a data element is demoted from the higher performance portion.

Referring to FIG. 10, one embodiment of a method 1000 that may be executed when a data element is demoted (i.e., evicted) from the higher performance portion 218a is illustrated. Such a demotion may occur when space is needed in the higher performance portion 218a to accommodate additional data elements. As shown, the method 1000 initially determines 1002 whether data needs to be demoted from the higher performance portion 218a. If so, the method 1000 analyzes the LRU list 302a associated with the higher performance portion 218a to determine 1004 the least recently used data element that is in line to be removed from the higher performance portion 218a. The method 1000 then removes 1004 this data element from the higher performance portion 218a.

At this point, the method 1000 determines 1006 whether the data element that was removed from the higher performance portion 218a is sequential data. If so, nothing further is performed since it would be disadvantageous to add sequential data to the lower performance portion 218b. If the data element is not sequential, the method 1000 determines 1008 whether the read access count 306a associated with the data element is greater than a specified threshold and determines 1010 whether the write access count 308a associated with the data element is less than a specified threshold. If both of these conditions are true, the method 1000 places 1012 the data element that was demoted from the higher performance portion 218a in the lower performance portion 218b. In essence, the method 1000 places 1012 data elements in the lower performance portion 218b if the data elements are read frequently (thereby enhancing future read performance for the data elements) but written to infrequently since excessive writes to the data elements may place excessive wear on the lower performance portion 218b.

Figure 11:
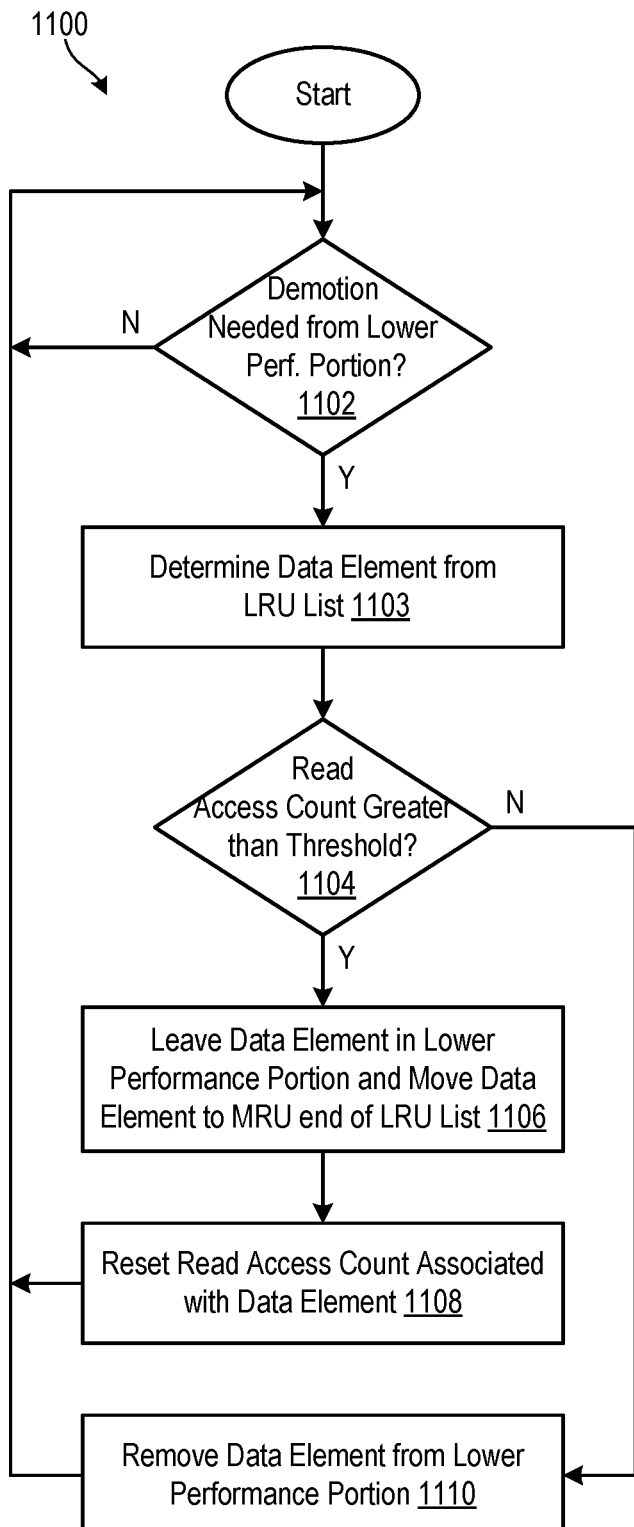
FIG. 11 is a flow diagram showing one embodiment of a method that may be executed when a data element is demoted from the lower performance portion.

Referring to FIG. 11, one embodiment of a method 1100 that may be executed when a data element is demoted (i.e., evicted) from the lower performance portion 218b is illustrated. Such a demotion may occur when space is needed in the lower performance portion 218b. As shown, the method 1100 initially determines 1102 whether data needs to be demoted from the lower performance portion 218b. If so, the method 1100 analyzes the LRU list 302b associated with the lower performance portion 218b to determine 1103 which data element is in line to be removed from the lower performance portion 218b.

At this point, the method 1100 determines 1104 whether the read access count 306b for the data element that is line to be removed is greater than a threshold (to determine if the data element is read frequently). If the read access count 306b is above the threshold, the method 1100 leaves 1106 the data element in the lower performance portion 218b and moves a reference to the data element to the MRU (most recently used) end of the LRU list 302b. In other words, the method 1100 does not remove the data element from the lower performance portion 218b since it is determined to be read frequently and would benefit from being retained in the lower performance portion 218b. The method 1100 also resets 1108 (e.g., sets to zero) the read access count 306b associated with the data element. The method 1100 then returns to the top (i.e., step 1102) where it may analyze the next data element in line to be removed from the lower performance portion 218b.

On the other hand, if, at step 1104, the read access count 306b associated with the data element is not above the threshold, the method 1100 removes 1110 the data element from the lower performance portion 218b.

Figure 12:
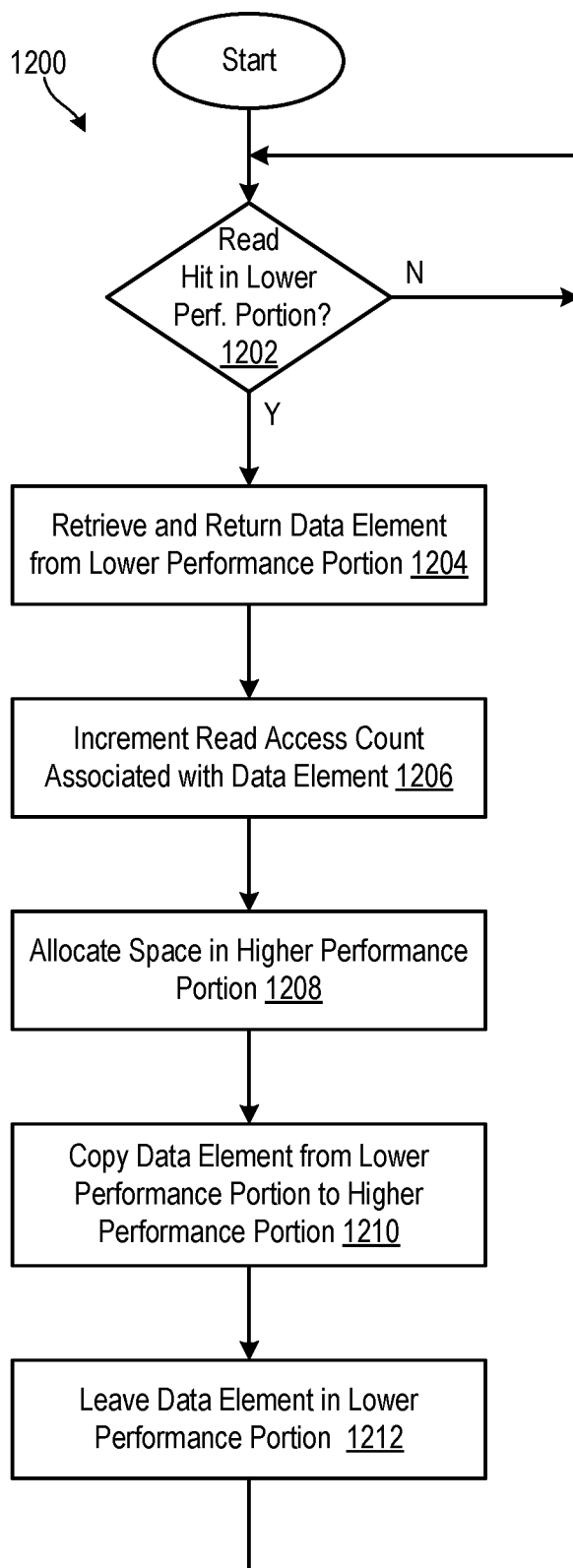
FIG. 12 is a flow diagram showing an alternative embodiment of a method that may be executed in response to a read hit in the lower performance portion.
Figure 13:
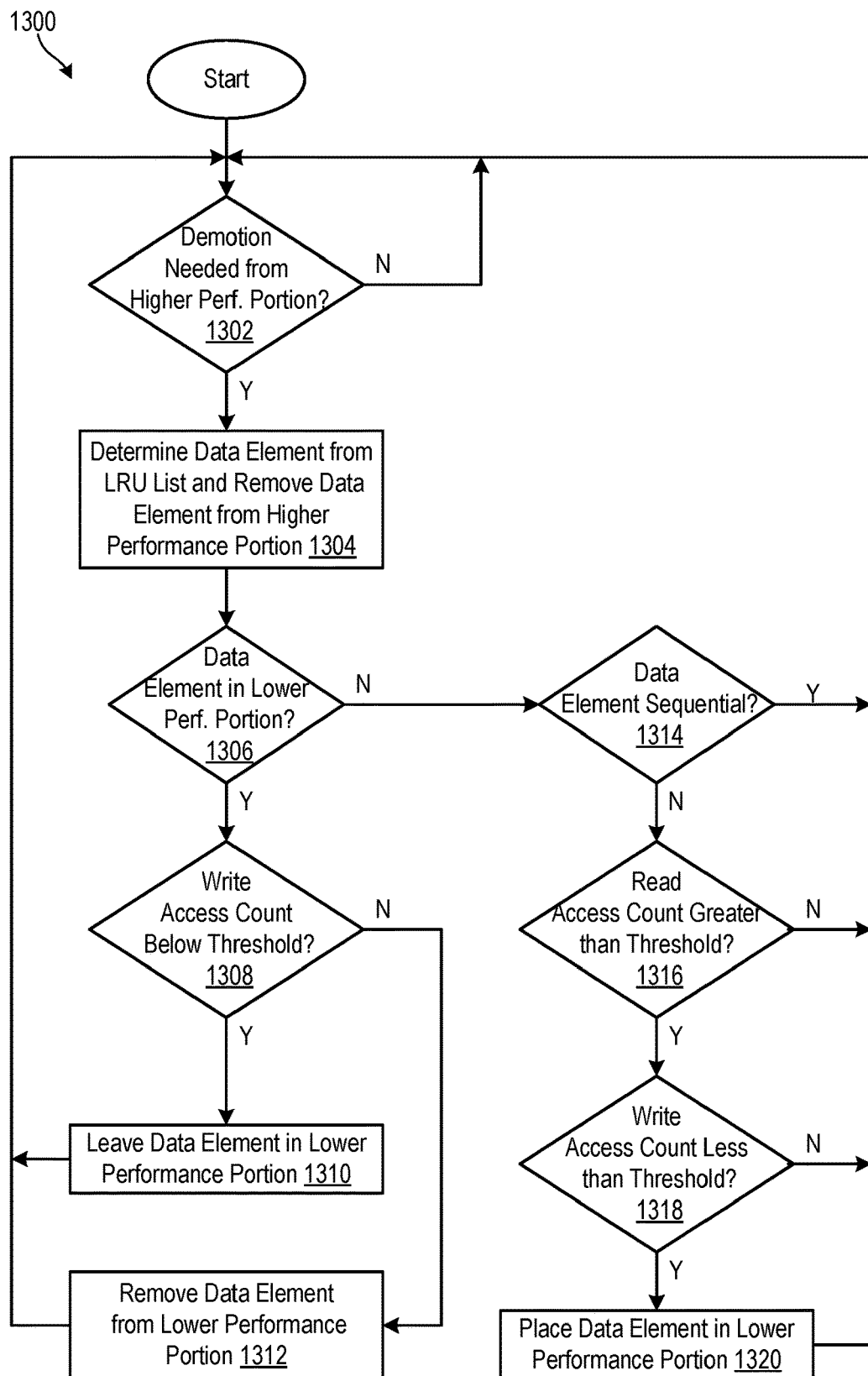
FIG. 13 is a flow diagram showing an alternative embodiment of a method that may be executed when a data element is demoted from the higher performance portion.

Referring generally to FIGS. 12 and 13, as was previously mentioned, the methods illustrated in FIGS. 5 through 11 are generally configured to maintain a single copy of a data element in the heterogeneous cache 218. That is, if a data element resides in the higher performance portion 218a, it will generally not reside in (or will be removed from) the lower performance portion 218b, and vice versa. This provides the best overall cache capacity at the expense of having to copy data elements from the higher performance portion 218a to the lower performance portion 218b when data elements are demoted from the higher performance portion 218a, which may increase processor utilization. Thus, a tradeoff exists between cache capacity and processor utilization.

In certain embodiments, the methods illustrated in FIGS. 5 through 11 may be modified to maintain, for the most part, a copy of a data element in both the higher performance portion 218a and the lower performance portion 218b. Although this may reduce overall cache storage capacity, it may advantageously reduce processor utilization by reducing the need to copy data elements between the higher performance portion 218a and the lower performance portion 218b.

FIG. 12 is a flow diagram showing an alternative method 1200 that may be executed in response to a read hit in the lower performance portion 218b. This method 1200 may be executed in environments where duplicate copies of data elements are maintained in the higher performance portion 218a and the lower performance portion 218b. This method 1200 may be used to replace the method 600 described in FIG. 6, which may be used in environments where only a single copy is maintained.

As shown, the method 1200 determines 1202 whether a read hit has occurred in the lower performance portion 218b. If so, the method 1200 retrieves 1204 and returns 1206 a data element associated with the read request from the lower performance portion 218b to an originator of the read request. The method 1200 increments 1206 the read access count 306*b* associated with the data element.

In response to the read hit, the method 1200 allocates 1208 space in the higher performance portion 218*a* that is sufficient to accommodate the data element. The method 1200 then copies 1210 the data element associated with the read request from the lower performance portion 218*b* to the higher performance portion 218*a*. The data element may be left 1212 in the lower performance portion 218*b*. This may provide duplicate copies of the data element in the higher performance portion 218*a* and the lower performance portion 218*b*.

FIG. 13 is a flow diagram showing an alternative method 1300 that may be executed when a data element is demoted from the higher performance portion 218*a*. This method 1300 may also be executed in environments where duplicate copies of data elements are maintained in the higher performance portion 218*a* and the lower performance portion 218*b*. This method 1300 may be used to replace the method 1000 described in FIG. 10, which may be used in environments where only a single copy is maintained.

As shown, the method 1300 initially determines 1302 whether data needs to be demoted from the higher performance portion 218*a*. If so, the method 1300 analyzes the LRU list 302*a* associated with the higher performance portion 218*a* to determine 1304 which data element is in line to be removed from the higher performance portion 218*a*. The method 1300 then removes 1304 this data element from the higher performance portion 218*a*.

The method 1300 then determines 1306 whether the data element that was removed from the higher performance portion 218*a* also resides in the lower performance portion 218*b*. If so, the method 1300 determines 1308 whether a write access count 308*b* associated with the data element is below a threshold. In essence, this step 1308 determines whether the data element is updated frequently. If the data element is not updated frequently (i.e., the write access count 308*b* for the data element is below the threshold), the data element is left 1310 in the lower performance portion 218*b* since the data element will not place excessive wear on the lower performance portion 218*b*. On the other hand, if the data element is updated frequently (i.e., the write access count 308*b* for the data element is above the threshold), the method 1300 removes 1312 the data element from the lower performance portion 218*b*.

If, at step 1306, the data element is not in the lower performance portion 218*b*, the method 1300 determines 1314 whether the data element that was removed from the higher performance portion 218*a* is sequential data. If so, nothing is changed since it would not be advantageous to add the data element to the lower performance portion 218*b*. If the data element is not sequential, the method 1300 determines 1316 whether a read access count 306*b* associated with the data element is greater than a specified threshold and determines 1318 whether a write access count 308*b* associated with the data element is less than a specified threshold. If so, the method 1300 places 1320 the data element that was demoted from the higher performance portion 218*a* in the lower performance portion 218*b*. In essence, the method 1300 places 1320 demoted data elements in the lower performance portion 218*b* if the data elements are read frequently (thereby enhancing future read performance for the data elements) but not updated frequently since excessive writes may place excessive wear on the lower performance portion 218*b* if it is implemented in a memory type (e.g., SCM) having write cycle limits.

Figure 14:
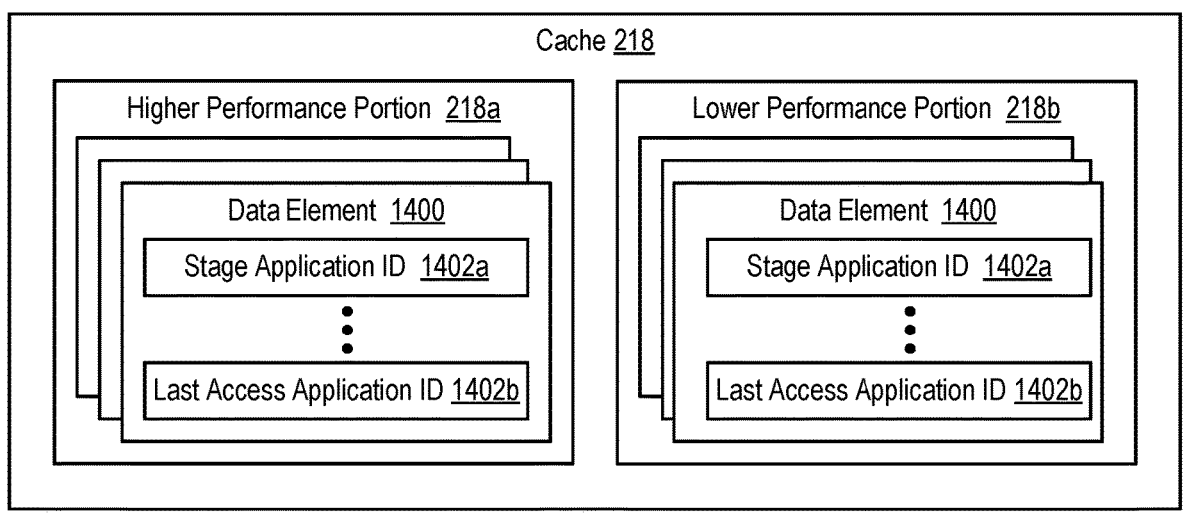
FIG. 14 is a high-level block diagram showing data elements in cache that are marked with one or more application identifiers.

Referring to FIG. 14, in certain cases, it may be advantageous or desirable to depopulate a heterogeneous cache 218 of selected data elements 1400 (e.g., tracks). For example, some data elements 1400 may be staged into cache 218 by or on behalf of an application (e.g., a batch job) that is configured to operate for a finite amount of time or over a prescribed time period. Once the application has completed its processing, the data elements 1400 may no longer be needed in cache 218 or will not be needed until the next time the application executes. In the meantime, the data elements 1400 that were accessed by the application may consume valuable storage space in the cache 218 and/or cause other data elements 1400 to be prematurely demoted from the cache 218. This may reduce cache hit ratios and/or other performance metrics of the cache 218.

In other cases, sensitive data may be staged into cache 218 by or on behalf of a secure or sensitive application. Once this data has been used and is no longer needed, it may be advantageous to clear this data from cache 218 for security reasons. Clearing data from the cache 218 may serve various purposes, including creating free storage space in the cache 218, increasing security for selected data within the cache 218, as well as preventing prematurely pushing other data out of the cache 218 (i.e., premature demotion).

In certain embodiments in accordance with the invention, functionality may be put in place to enable selected data elements 1400 associated with an application to be demoted from the cache 218, while allowing other data elements 1400 not associated with the application to remain in the cache 218. When data elements 1400 are brought into or accessed in the cache 218, systems and methods in accordance with the invention may mark these data elements 1400 with one or more application identifiers 1402. For example, when a data element 1400 is brought into the cache 218, the data element 1400 may be marked with a stage application identifier 1402*a* that identifies the application that staged the data element 1400 into the cache 218. Similarly, when an application accesses a data element 1400 in the cache 218, a last access application identifier 1402*b* associated with the data element 1400 may be updated to identify the application that was the last to access the data element 1400.

In certain embodiments, both the stage application identifier 1402*a* and last access application identifier 1402*b* are maintained for each data element 1400 in the cache 218. In other embodiments, all applications that have touched a data element 1400 while it is in cache 218 are recorded. For example, the stage application identifier 1402*a* and last access application identifier 1402*b* may be recorded as well as any applications that accessed the data element 1400 between the time the stage application identifier 1402*a* and last access application identifier 1402*b* were recorded.

Figure 15:
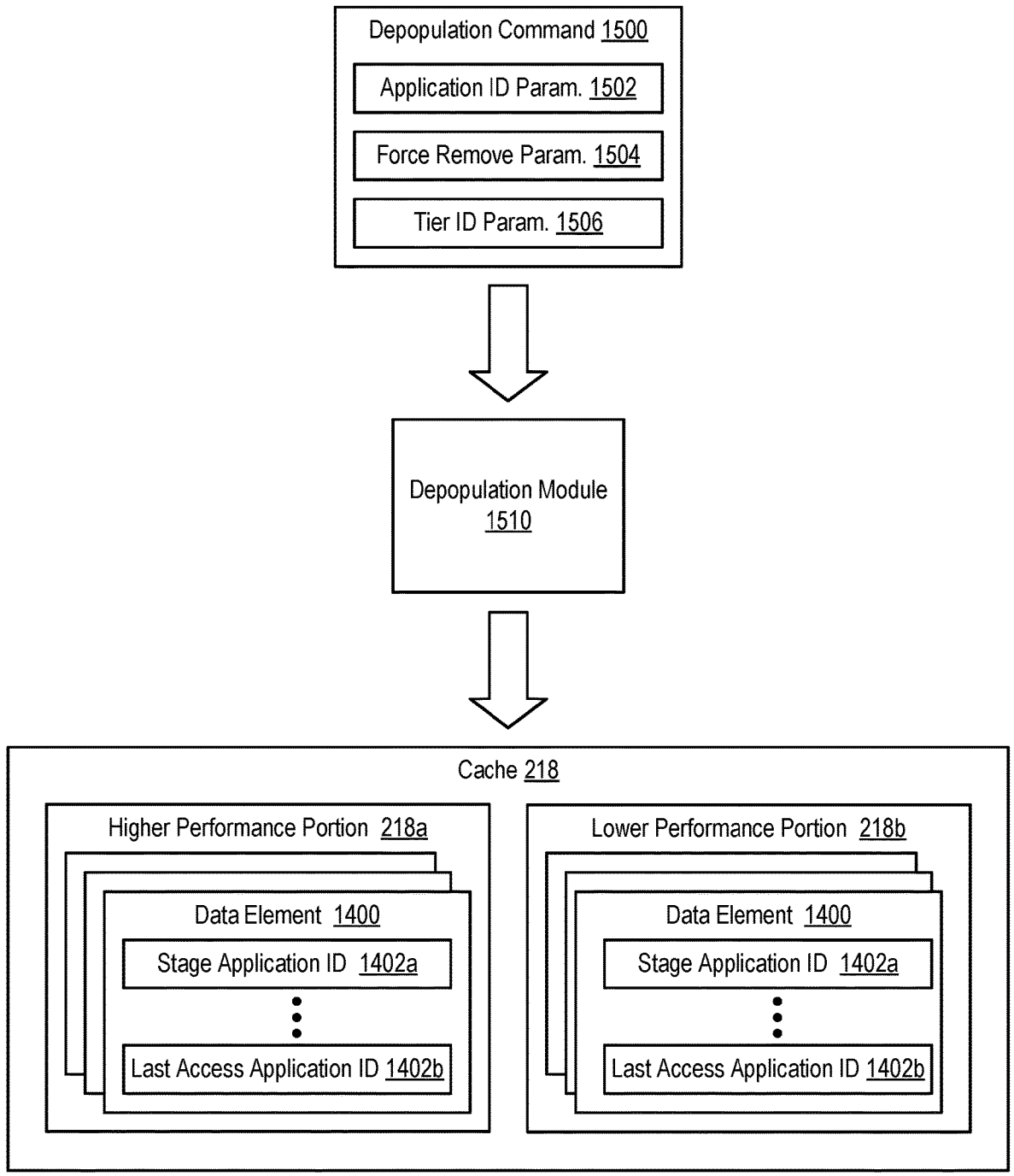
FIG. 15 is a high-level block diagram showing a depopulation command and depopulation module used to depopulate data elements in cache.

Referring to FIG. 15, in order to depopulate the cache 218 of selected data elements 1400, a depopulation module 1510 may be provided. The depopulation module 1510 may be implemented in hardware, software, firmware, or a combination thereof. The depopulation module 1510 may provide an application programming interface (API) configured to receive and execute a command 1500 to depopulate the cache 218 of selected data elements 1400. Such a command 1500 may have one or more parameters 1502, 1504, 1506 to define the depopulate operation. These parameters 1502, 1504, 1506 may include, for example, an application identifier parameter 1502, force remove parameter 1504, and tier identifier parameter 1506.

The application identifier parameter 1502 identifies an application for which associated data elements 1400 are to be removed from the cache 218. The way the application identifier parameter 1502 is used may depend on other parameters 1502, 1504, 1506 of the command 1500, such as the force remove parameter 1504. For example, if the force remove parameter 1504 is set, the depopulation module 1510 may remove data elements 1400 from the cache 218 for which the stage application identifier 1402*a*, last access application identifier 1402*b*, or possibly any other application identifier matches the application identifier parameter 1502. In other words, if an application associated with the application identifier parameter 1502 touched the data element 1400 in any way, the data element 1400 may be removed from the cache 218. By contrast, if the force remove parameter 1504 is not set, the depopulation module 1510 may remove data elements 1400 only if both the stage application identifier 1402*a* and the last access application identifier 1402 matches the application identifier parameter 1502. This may ensure that a data element 1400 is not removed from the cache 218 if the data element 1400 is accessed by multiple applications.

The tier identifier parameter 1506 may designate a tier or tiers from which particular data elements 1400 are removed. For example, where a cache 218 comprises multiple tiers (e.g., L1, L2, L3 levels of cache), the command 1500 and depopulation module 1510 may only remove data elements 1400 associated with an application from specific tiers. In the illustrated implementation, the tier identifier parameter 1506 may indicate that data elements 1400 are to be removed from the higher performance portion 218*a*, the lower performance portion 218*b*, and/or both. For example, in some cases, it may be desirable to remove data elements 1400 from the higher performance portion 218*a* but leave the same data elements 1400 in the lower performance portion 218*b*.

Figure 16:
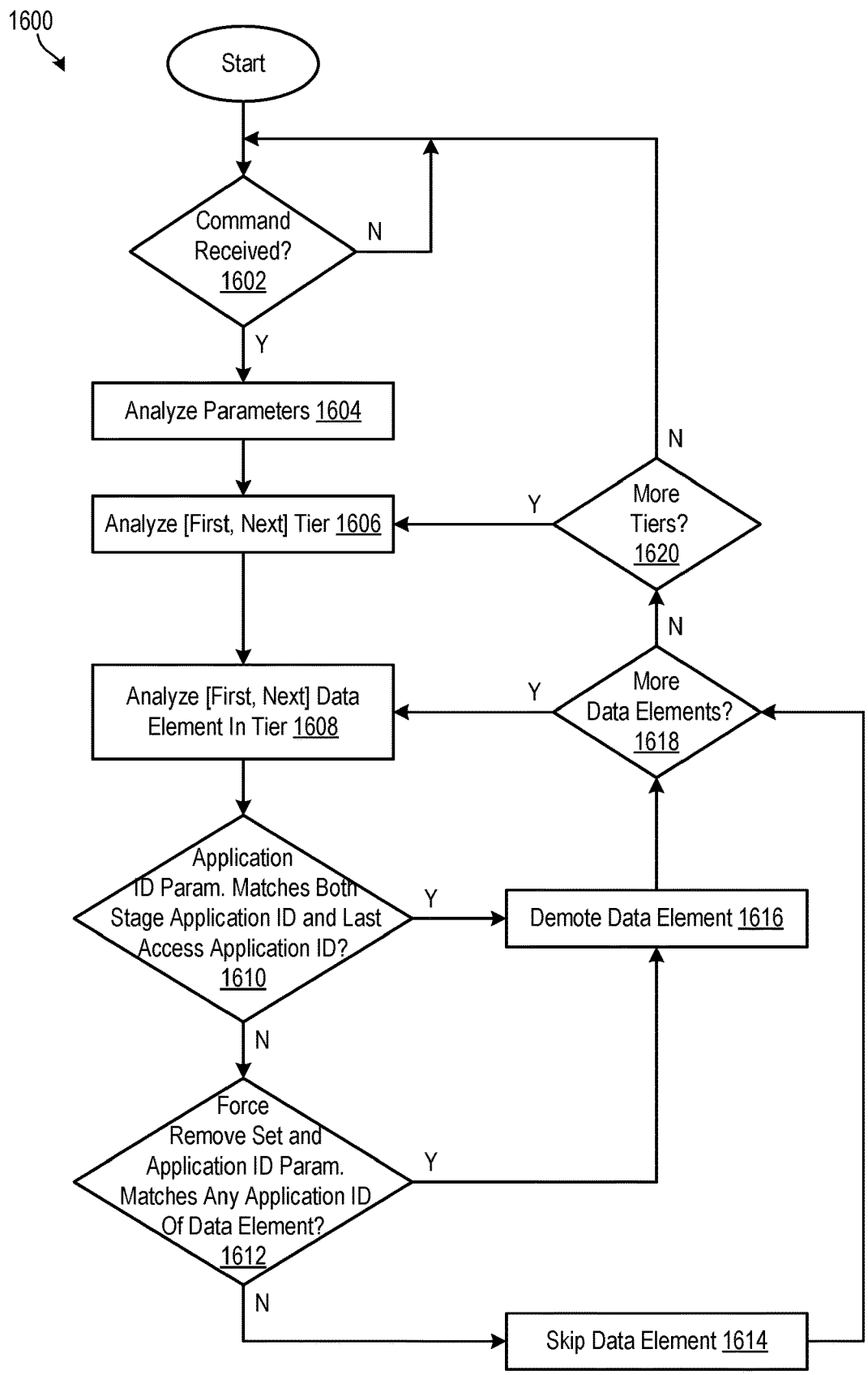
FIG. 16 is a flow diagram showing one embodiment of a method that may be executed by the depopulation module.

Referring to FIG. 16, one embodiment of a method 1600 that may be executed by the depopulation module 1510 is illustrated. As shown, the method 1600 initially determines 1602 whether a command 1500 to depopulate the cache 218 has been received. If so, the method 1600 analyzes 1604 parameters associated with the command 1500, such as the application identifier parameter 1502, force remove parameter 1504, and tier identifier parameter 1506 previously discussed.

The method 1600 then analyzes 1606 the first tier identified in the command 1500. Within this first tier, the method 1600 analyzes 1608 the first data element 1400 within the tier. If, at step 1610, the application identifier parameter 1502 matches both the stage application identifier 1402*a* and the last access application identifier 1402*b* associated with the data element 1400, the method 1600 demotes 1616 (i.e., removes) the data element 1400 from the tier of cache 218.

If, on the other hand, the application identifier parameter 1502 does not match both the stage application identifier 1402*a* and the last access application identifier 1402*b* associated with the data element 1400, the method 1600 determines 1612 whether the force remove parameter 1504 is set and whether the application identifier parameter 1502 matches any application identifier (i.e., the stage application identifier 1402*a*, the last access application identifier 1402*b*, etc.) associated with the data element 1400. If so, the method 1600 demotes 1616 the data element 1400 from the cache 218. If neither of the conditions 1610, 1612 is satisfied, the method 1600 skips 1614 the data element 1400, effectively leaving the data element 1400 in the cache 218.

At this point, the method 1600 determines 1618 whether any more data elements 1400 remain to be analyzed in the present tier of the cache 218. If more data elements 1400 remain, the method 1600 analyzes 1608 the next data element 1400 in the tier and repeats steps 1610, 1612, 1614, 1616. This process is repeated for each data element 1400 in the present tier of the cache 218 until all data elements 1400 in the tier have been analyzed.

Once all data elements 1400 in the tier have been analyzed, the method 1600 determines 1620 whether more tiers remain to be analyzed. If so, the method 1600 analyzes each data element 1400 in the next tier of cache 218. This is performed until all data elements 1400 are analyzed in all tiers identified by the tier identifier parameter 1506. In this way, a cache 218 such as a multi-tier or heterogeneous cache 218 may be depopulated of data elements 1400 associated with an application.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to depopulate data from a cache, the method comprising:
   storing, in a cache, a plurality of data elements that are marked with a first application identifier associated with an application that staged the data elements into the cache, and a second application identifier associated with an application that last accessed the data elements;
   receiving a command to depopulate the cache of selected data elements of the plurality of data elements, the command having an application identifier parameter;
   searching the cache for the selected data elements, wherein the selected data elements are those having at least one of the first application identifier and the second application identifier matching the application identifier parameter; and
   removing the selected data elements from the cache.

2. The method of claim 1, wherein the command further has at least one cache tier identifier as a parameter.

3. The method of claim 2, wherein removing the selected data elements from the cache comprises removing the data elements from at least one tier of the cache that is associated with the at least one cache tier identifier.

4. The method of claim 1, wherein the command further includes a force remove parameter.

5. The method of claim 4, wherein the force remove parameter causes removal of data elements from the cache having any application identifier that matches the application identifier parameter.

6. The method of claim 5, wherein removing the selected data elements from the cache comprises only removing the data elements from the cache if the application identifier matches both the first application identifier and the second application identifier.

7. The method of claim 5, wherein removing the selected data elements from the cache comprises only removing the data elements from the cache if the application identifier matches either of the first application identifier and the second application identifier.

8. A computer program product to depopulate data from a cache, the computer program product comprising a non-transitory computer-readable storage medium having computer-usable program code embodied therein, the computer-usable program code configured to perform the following when executed by at least one processor:
  store, in a cache, a plurality of data elements that are marked with a first application identifier associated with an application that staged the data elements into the cache, and a second application identifier associated with an application that last accessed the data elements;
  receive a command to depopulate the cache of selected data elements of the plurality of data elements, the command having an application identifier parameter;
  search the cache for the selected data elements, wherein the selected data elements are those having at least one of the first application identifier and the second application identifier matching the application identifier parameter; and
  remove the selected data elements from the cache.

9. The computer program product of claim 8, wherein the command further has at least one cache tier identifier as a parameter.

10. The computer program product of claim 9, wherein removing the selected data elements from the cache comprises removing the data elements from at least one tier of the cache that is associated with the at least one cache tier identifier.

11. The computer program product of claim 8, wherein the command further includes a force remove parameter.

12. The computer program product of claim 11, wherein the force remove parameter causes removal of data elements from the cache having any application identifier that matches the application identifier parameter.

13. The computer program product of claim 12, wherein removing the selected data elements from the cache comprises only removing the data elements from the cache if the application identifier matches both the first application identifier and the second application identifier.

14. The computer program product of claim 12, wherein removing the selected data elements from the cache comprises only removing the data elements from the cache if the application identifier matches either of the first application identifier and the second application identifier.

15. A system to depopulate data from a cache, the system comprising:
  at least one processor; and
  at least one memory device operably coupled to the at least one processor and storing instructions for execution on the at least one processor, the instructions causing the at least one processor to:
    store, in a cache, a plurality of data elements that are marked with a first application identifier associated with an application that staged the data elements into the cache, and a second application identifier associated with an application that last accessed the data elements;
    receive a command to depopulate the cache of selected data elements of the plurality of data elements, the command having an application identifier parameter;
    search the cache for the selected data elements, wherein the selected data elements are those having at least one of the first application identifier and the second application identifier matching the application identifier parameter; and
    remove the selected data elements from the cache.

16. The system of claim 15, wherein the command further has at least one cache tier identifier as a parameter.

17. The system of claim 16, wherein removing the selected data elements from the cache comprises removing the data elements from at least one tier of the cache that is associated with the at least one cache tier identifier.

18. The system of claim 15, wherein the command further includes a force remove parameter that causes removal of data elements from the cache having any application identifier that matches the application identifier parameter.

19. The system of claim 18, wherein removing the selected data elements from the cache comprises only removing the data elements from the cache if the application identifier matches both the first application identifier and the second application identifier.

20. The system of claim 18, wherein removing the selected data elements from the cache comprises only removing the data elements from the cache if the application identifier matches either of the first application identifier and the second application identifier.

* * * * *